(12) United States Patent
Kodama

(10) Patent No.: US 12,361,670 B2
(45) Date of Patent: Jul. 15, 2025

(54) IMAGE PROCESSING DEVICE, IMAGE PROCESSING METHOD, MOVING DEVICE, AND STORAGE MEDIUM

(71) Applicant: CANON KABUSHIKI KAISHA, Tokyo (JP)

(72) Inventor: Shigeo Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 17/703,545

(22) Filed: Mar. 24, 2022

(65) Prior Publication Data
US 2022/0319145 A1    Oct. 6, 2022

(30) Foreign Application Priority Data
Mar. 30, 2021   (JP) .................. 2021-056596

(51) Int. Cl.
*G06V 10/26*   (2022.01)
*G06T 3/40*    (2006.01)
*G06T 7/215*   (2017.01)
*G06V 10/764*  (2022.01)

(52) U.S. Cl.
CPC .............. *G06V 10/26* (2022.01); *G06T 3/40* (2013.01); *G06T 7/215* (2017.01); *G06V 10/765* (2022.01)

(58) Field of Classification Search
CPC ...... G06V 10/26; G06V 10/765; G06V 10/25; G06T 3/40; G06T 7/215; G06T 7/11; G06T 5/50; G06T 5/77; G06T 7/001; G06T 2207/20221
See application file for complete search history.

(56) References Cited

U.S. PATENT DOCUMENTS

| 2017/0206431 A1 | 7/2017 | Sun et al. |
| 2019/0180116 A1 | 6/2019 | Tasaki et al. |
| 2022/0301276 A1* | 9/2022 | Isano .................. G06T 7/70 |

FOREIGN PATENT DOCUMENTS

| CN | 110443159 A | 11/2019 |
| JP | 2019008460 A | 1/2019 |
| JP | 2020516853 A | 6/2020 |
| WO | 2019016870 A1 | 1/2019 |

OTHER PUBLICATIONS

Ladický, L., Sturgess, P., Alahari, K., Russell, C. and Torr, P.H., 2010. What, where and how many? combining object detectors and crfs. In Computer Vision—ECCV 2010: 11th European Conference on Computer Vision, Heraklion, Crete, Greece, Sep. 5- 11, 2010, Proceedings, Part IV 11 (pp. 424-437). Springer Berlin.*

(Continued)

*Primary Examiner* — Zhitong Chen
(74) *Attorney, Agent, or Firm* — Canon U.S.A., Inc. IP Division

(57) ABSTRACT

In order to realize an image processing device capable of obtaining a high-accuracy region division result while suppressing a processing load, an image processing device includes an object detection unit configured to detect an object from image data, a region setting unit configured to set a target region in which a category is assigned to pixels in accordance with a detection result of the object detection unit, and a category assignment unit configured to assign the category to the pixels belonging to the category of the target region which is set by the region setting unit.

26 Claims, 12 Drawing Sheets

(56) References Cited

OTHER PUBLICATIONS

Li, X., Ma, H., Wang, X. and Zhang, X., 2017. Traffic light recognition for complex scene with fusion detections. IEEE Transactions on Intelligent Transportation Systems, 19(1), pp. 199-208.*
Lubor Ladicky et al., "What, Where & How Many? Combining Object Detectors and CRFs", ECCV 2010, Sep. 2010.

* cited by examiner

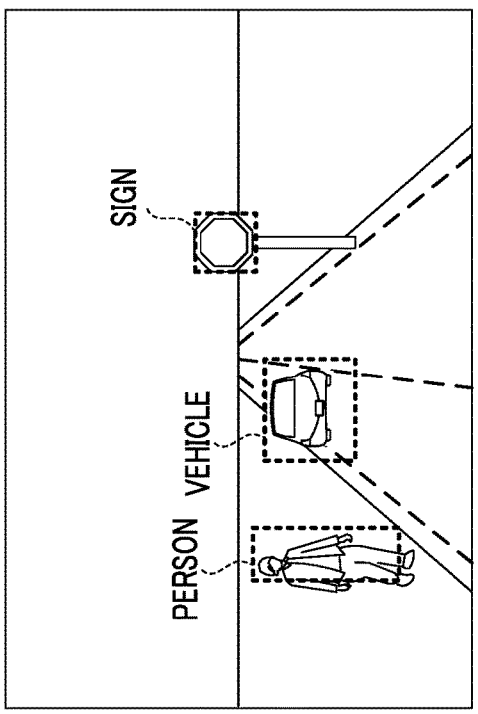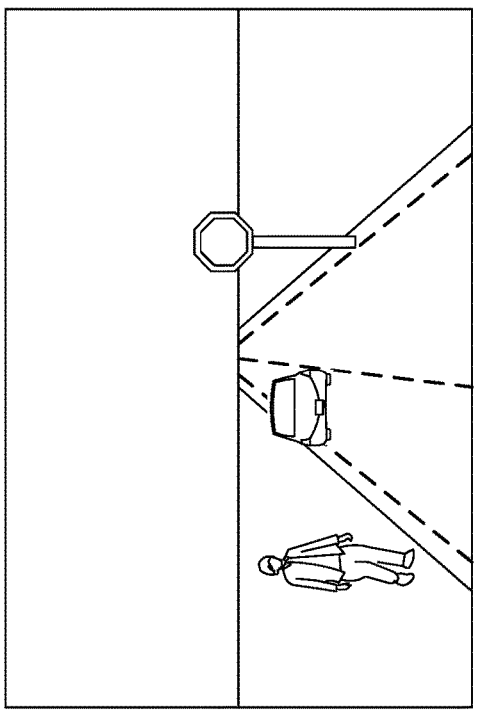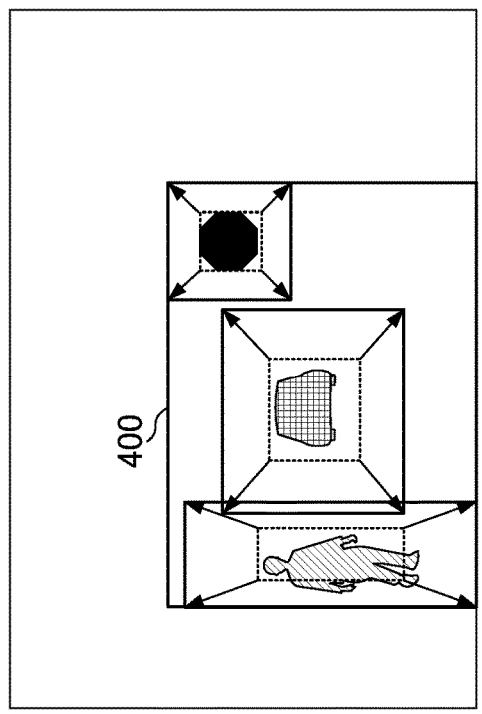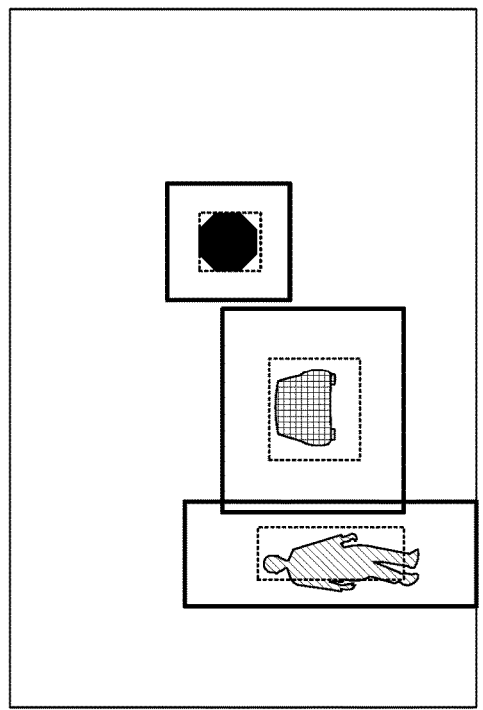

IMAGE PROCESSING DEVICE, IMAGE PROCESSING METHOD, MOVING DEVICE, AND STORAGE MEDIUM

BACKGROUND

Field

The present disclosure relates to an image processing device, an image processing method, a moving device, a storage medium, and the like.

Description of the Related Art

Technological development for automated driving of vehicles and understanding of the surrounding environment of self-propelled robots has progressed, and in particular, technology of estimating a distance to a target object using machine learning has progressed. For example, in order to estimate a distance to a traffic signal while a vehicle is traveling, there is a technique of estimating a distance to a traffic signal by comparing the actual size of the light-emitting portion of the traffic signal stipulated by standards with the number of pixels of the diameter of the light-emitting portion or the area thereof on an image on which region division is performed by a machine learning model. As a region division method, there is object detection in which a machine learning model identifies (categorizes) a traffic signal on an image and sets a rectangle (detection region) including the object. Also, there is a method called semantic segmentation in which semantic region division is performed by performing category classification in units of pixels.

Lubor Ladicky, Paul Sturgess, Karteek Alahari, Chris Russell, and Philip H. S. Torr, What, Where & How Many? Combining Object Detectors and CRFs, ECCV2010

In order to improve the accuracy of the region division, the above document discloses a technique of estimating the presence range of an object from an object detection result, raising the possibility of the object being present in this estimated range, and then performing semantic segmentation.

Alternatively, the above document discloses a technique of detecting a region in which a target is present from an image, cutting out a first image by enlarging the region from the image, generating a second image from a target in the region, and performing machine learning using the first image and the second image.

For object detection, a plurality of neural network configurations capable of processing at a high speed are proposed. On the other hand, it is known that semantic segmentation is capable of region division with a high degree of accuracy, but tends to require a large amount of calculation as compared with object detection. Since the technique disclosed in the above document implements each of these machine learning models, the processing load may be too high for processing requiring a real-time property such as automatic operation.

SUMMARY

Consequently, this disclosure provides an image processing device or the like capable of obtaining a high-accuracy region division result while suppressing a processing load.

According to one aspect of the present disclosure, there is provided an image processing device comprising at least one processor configured to function as:

an object detection unit configured to detect an object from image data;
a region setting unit configured to set a target region in which a category is assigned to pixels in accordance with a detection result of the object detection unit; and
a category assignment unit configured to assign the category to the pixels belonging to the category of the target region which is set by the region setting unit.

Further features of the present disclosure will become apparent from the following description of embodiments with reference to the attached drawings.

BRIEF DESCRIPTION OF THE DRAWINGS

FIGS. 4A to 4D are diagrams illustrating an example of image data in the first embodiment.

DESCRIPTION OF THE EMBODIMENTS

Hereinafter, with reference to the accompanying drawings, favorable modes of the present disclosure will be described using embodiments. In each diagram, the same reference signs are applied to the same members or elements, and duplicate description will be omitted or simplified.

Also, in an embodiment, an example of application to an in-vehicle camera as an image processing device will be described. However, image processing devices include any electronic instrument having an imaging function, such as a digital still camera, a digital movie camera, a smartphone with a camera, a tablet computer with a camera, a network camera, a drone camera, and a camera mounted on a robot.

Also, in an embodiment, an example of an image processing device mounted in an automobile as a moving device will be described, but the moving device is not limited to an automobile, and may be another movable device, such as an airplane, a ship, a robot, or a drone.

First Embodiment

In a first embodiment of the present disclosure, object detection is performed on image data, and a category and a detection region thereof are specified. Further, an example will be described in which image data having an enlarged detection region is cut out on the basis of the degree of deviation from an expected correct-answer region in the detection region specified by the object detection, and semantic segmentation is performed on the enlarged image data. The categories which are detection targets dealt with in the semantic segmentation of the present embodiment are natural objects and artificial objects, such as people, animals, automobiles, two-wheeled vehicles, buildings, roads, traffic signals, and traffic signs.

(Configuration of Image Processing Device)

Figure 1:
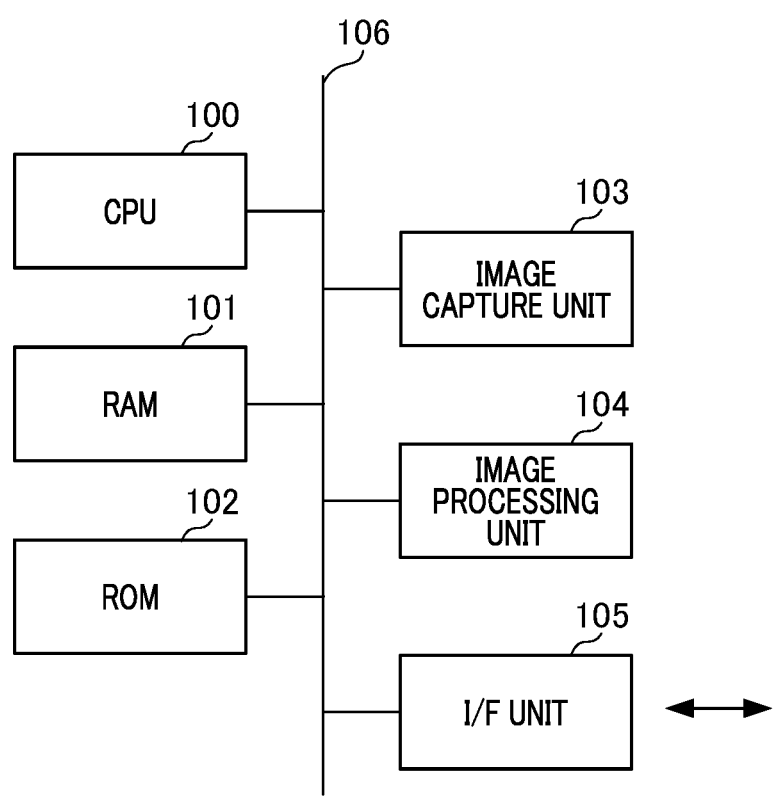
FIG. 1 is a block diagram illustrating a configuration example of an image processing device in a first embodiment of the present disclosure.

FIG. 1 is a block diagram illustrating a configuration example of an image processing device according to the present embodiment. The image processing device includes a CPU 100, a RAM 101, a ROM 102, an image capture unit 103, an image processing unit 104, an OF (interface) unit 105, and a bus 106.

The CPU 100 controls the operation of the entire image processing device using computer programs and data stored in the RAM 101 and the ROM 102.

The RAM 101 has a storage region for temporarily storing computer programs loaded through the IN unit 105, image data for the latest amount of several frames, processing parameters used in the image processing unit 104, and the like. Also, the RAM has a storage region used when the CPU 100 executes various processes or a storage region used when the image processing unit 104 performs image processing. Therefore, the RAM 101 can appropriately provide various storage regions.

The ROM 102 stores setting data of the present device, a boot program, and the like.

The image capture unit 103 is a camera constituted by an optical lens, a CMOS image sensor, or the like, and acquires video data, which is a target for imaging. In the present embodiment, an image converted into an RGB color image by performing general sensor correction or demosaic processing is stored in the RAM 101.

The image processing unit 104 is realized as a processor capable of executing a computer program stored in the ROM 102 or the like or a dedicated image processing circuit, and performs an image processing method of the present embodiment. For example, if an instruction to execute image processing is accepted from the CPU 100, the image data stored in the RAM 101 is processed, and a region division map in which semantic segmentation is performed on a region including a detection target is output. Also, at the time of image processing, processing may be performed while appropriately reading out the processing parameters stored in the RAM 101. Meanwhile, the region division map formed by semantic segmentation indicates a map to which category information is assigned for each pixel (for example, for each pixel or for each of a plurality of pixels).

The I/F unit 105 functions as an interface for connecting the present device to an external storage device or the Internet.

Each of the above units is connected to the bus 106.

Meanwhile, the configuration of the image processing device of the present embodiment is not limited to the configuration shown in FIG. 1.

(Configuration of Image Processing Unit)

Figure 2:
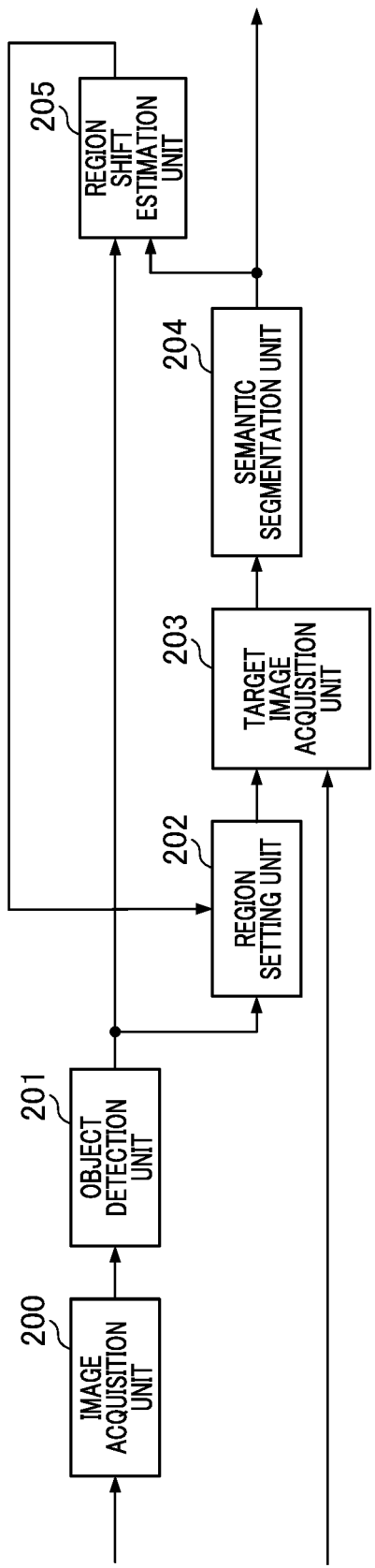
FIG. 2 is a functional block diagram illustrating a configuration example of an image processing unit in the first embodiment.

Next, FIG. 2 is a functional block diagram illustrating a configuration example of the image processing unit in the first embodiment, and if the image processing unit 104 is realized as a dedicated image processing circuit, it may be constituted by the functional blocks shown in FIG. 2.

Figure 3:
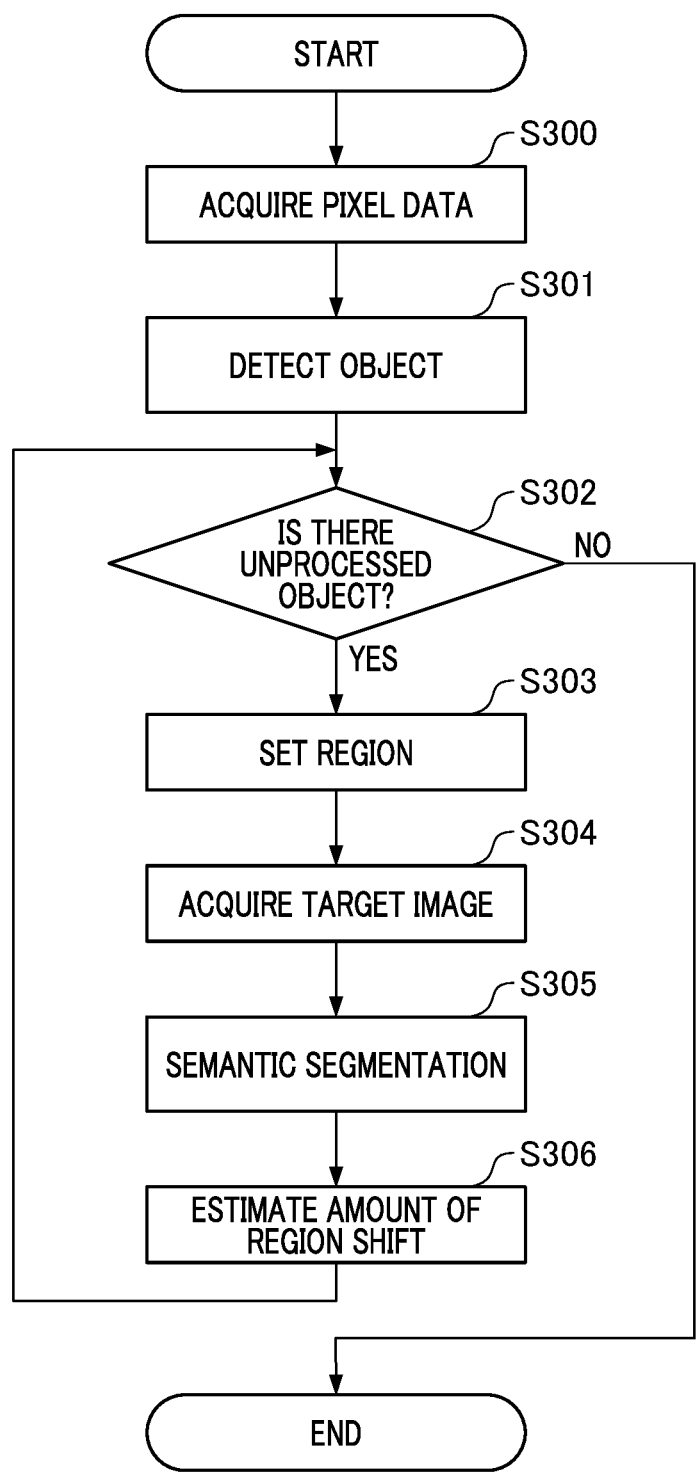
FIG. 3 is a flowchart illustrating an operation example of the image processing unit in the first embodiment.

In the present embodiment, the image processing unit 104 is a processor capable of executing a computer program stored in the ROM 102 or the like, and the function of each block of FIG. 2 is realized by executing processing in accordance with a processing flowchart shown in FIG. 3.

As shown in FIG. 2, the image processing unit 104 includes an image acquisition unit 200, an object detection unit 201, a region setting unit 202, a target image acquisition unit 203, a semantic segmentation unit 204, and a region shift estimation unit 205. Each of the reference numerals 200 to 205 is a functional block realized by a processor.

The image acquisition unit 200 acquires image data, which is a process target stored in the RAM 101.

The object detection unit 201 detects a plurality of objects using a predetermined method from the image data, and identifies and outputs the categories of these objects and the detection region in which the objects are detected.

The region setting unit 202 sets a predetermined detection region in which the detection region is corrected in accordance with a shift from a region having a possibility of a correct-answer region actually being present with respect to the detection region as a target region for performing semantic segmentation. That is, the region setting unit sets a target region in which a category is assigned to a pixel in accordance with the detection result of the object detection unit.

The target image acquisition unit 203 acquires image data of the region which is set by the region setting unit 202 from the RAM 101.

The semantic segmentation unit 204 inputs the image data of the target region which is set by the region setting unit 202 through the target image acquisition unit 203, and performs region division on the object and the background in accordance with the category. Here, the semantic segmentation unit 204 functions as a category assignment unit that assigns the category to pixels belonging to a predetermined category in the image data of the target region.

Meanwhile, when a category is assigned for each pixel, a category may be assigned for each of a plurality of pixels instead of for each pixel.

The region shift estimation unit 205 compares the output results of the object detection unit 201 and the semantic segmentation unit 204, and estimates the amount of region shift occurring in the object detection unit 201.

(Description of Operation of Image Processing Unit)

FIG. 3 is a flowchart illustrating an operation example of the image processing unit in the first embodiment. By the processor in the image processing unit 104 executing a computer program, the function of each block shown in FIG. 2 is realized, and the process of each operation of FIG. 3 is performed.

If the process is started, in S300, image data is first acquired from the RAM 101 by the image acquisition unit 200.

FIGS. 4A-4D are diagrams illustrating an example of image data in the first embodiment, and the image data shown in FIG. 4A is an example in which a person, an automobile, and a traffic sign are target objects on a road.

In S301, the object detection unit 201 detects an object in the image data, and identifies and outputs information on the category of the object and a detection region in which the object is detected (object detection step). The object detection method may be the same process as a method of the related art. A region-based CNN (R-CNN), you only look once (YOLO), a single shot detector (SSD), and the like are known as neural networks that have a relatively low processing load and can perform object detection with high robustness.

In the present embodiment, for these general neural networks, object detection is performed using a model machine-learned by a learning image data set in which categories (e.g., person, vehicle, sign) and correct-answer data of the detection region for each category are associated with each other. If the detection region becomes equal to or more than a predetermined overlap rate with a correct-answer region and then the detected category is correct as a correct answer, the detection is considered successful, and the detection rate indicating the accuracy of detection in object detection is calculated. Intersection over union (IoU) or the like is used as a standard for the overlap rate between the detection region and the correct-answer region. In addition, as an example of the predetermined overlap rate, 50%, 75%, or the like can be considered.

In the present embodiment, FIG. 4B shows a schematic diagram in a case where object detection is performed. The object detection neural network automatically defines characteristics required for object detection from learning data, and gradually unifies these local characteristics to obtain a comprehensive determination. Therefore, for example, if there is no network scale large enough to express the characteristics required for the identification of the target object, if there is a characteristic difference between the learning data and the image data which is actually inferred, or the like, the performance of object detection may not be fully exhibited.

Therefore, the detection region which is output if object detection is performed on the image data undergoes a region shift from the detection region considered to be a correct answer. In the present embodiment, the accuracy of semantic segmentation is improved by setting a region for semantic segmentation while considering this region shift.

In S302, branching is performed depending on whether there is an unprocessed object. If there is an unprocessed object, the process proceeds to S303, and the process is completed if all the undetected and detected objects are processed.

In S303, the region setting unit 202 corrects the detection region which is output by the object detection unit 201 in accordance with the shift from a region having a possibility of a correct-answer region actually being present with respect to the detection region. Thereby, the target region for performing semantic segmentation is set to be optimized (region setting step). A region setting method will be described with reference to FIG. 5.

Figure 5A:
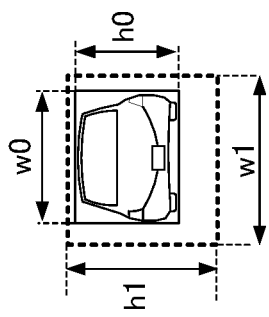
FIGS. 5A to 5C are diagrams illustrating target region setting in the first embodiment.
Figure 5B:
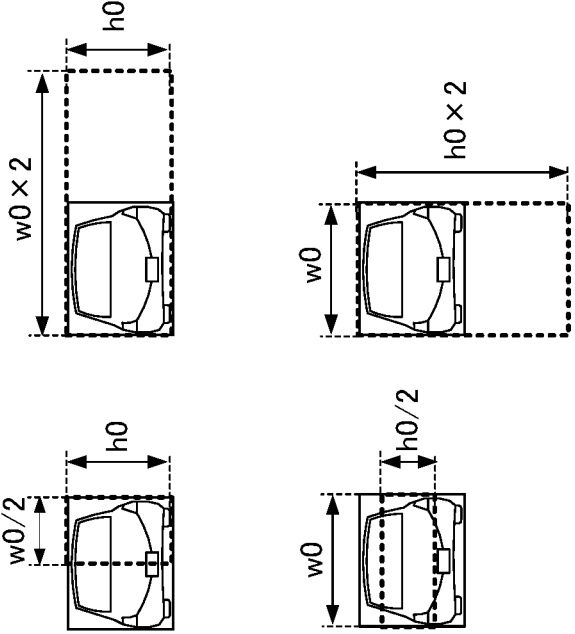
Figure 5C:
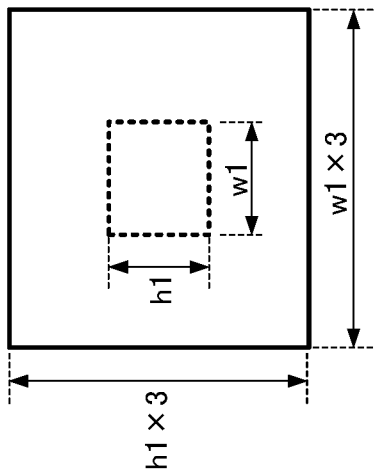

FIGS. 5A-C are diagrams illustrating target region setting in the first embodiment, and FIG. 5A shows a detection region in a case where a vehicle is detected (a frame of a broken line in the drawing) and a region assumed to be a correct answer (a frame of a solid line in the drawing). The region assumed to be a correct answer is assumed to be a rectangle circumscribing a target object.

As shown in the drawing, the detection region has a possibility that a region shift from a correct-answer region will occur. Therefore, in the present embodiment, a region for performing semantic segmentation is set by correcting the detection region in accordance with the region shift from a correct-answer region. FIG. 5B shows an example of a relationship between the detection region and the correct-answer region in the case of IoU=50%. The two on the left side in FIG. 5B show a case where the detection region is output so as to be included in the correct-answer region, and the two on the right side in FIG. 5B show a case where the detection region is output so as to include the correct-answer region.

Assuming that IoU=50% from FIG. 5B, it can be understood that the width w1 of the detection region is in the range of w0/2 to w0*2, and that the height h1 of the detection region is in the range of h1/2 to h1*2. Therefore, it is assumed that an actual correct-answer region is present in the above range with respect to the detection region detected by an object detection model for obtaining a detection rate based on IoU=50%. FIG. 5C shows a corrected region (an outward rectangle in the drawing) in a case where the fluctuation rate I of the detection region is set to 0.5 (equivalent to IoU=50%). The detection region can be corrected to a region including the correct-answer region by extending a region of $(1/I-1)*w1$ in the horizontal direction from the relationship between the correct-answer region and the detection region shown in FIG. 5B and extending a region of $(1/I-1)*h1$ in the vertical direction.

The corrected region is obtained by enlarging the width and height of the detection region three times on the assumption that the detection region overlaps the correct-answer region at IoU=50% or more. Even in a case where the detection region fluctuates, an object is included in the corrected region, and thus region division can be performed reliably. On the other hand, by minimizing the extension of the region, the processing amount of subsequent semantic segmentation can be suppressed.

In the present embodiment, in this way, the detection region corrected by enlargement, for example, in accordance with a shift from a region having a possibility of a correct-answer region actually being present with respect to the detection region, is set as a target region for semantic segmentation. Meanwhile, as the fluctuation rate due to object detection, fluctuation rates differing in the horizontal direction and the vertical direction may be used, or fluctuation rates differing depending on the category value may be used. That is, the region setting unit may correct the detection region in accordance with the category and set the target region.

Further, if object detection including the correct-answer region in the detection region is performed, semantic segmentation may be performed without extending the detection region.

In S304, the target image acquisition unit 203 acquires the image data of the target region which is set in S303 from the RAM 101. Since the image data acquired here is limited to the target region, the number of accesses to the RAM 101 can be reduced. Also, in order to further reduce the number of accesses to the RAM 101, a cache configuration may be used in which a storage region for temporarily holding image data is secured in the image acquisition unit 200 and the image data is read out from the storage region if there is the image data of the target region in this storage region.

In S305, the semantic segmentation unit 204 performs region division for each pixel based on the category by assigning the category to pixels belonging to a predetermined category in the image data of the target region (category assignment step). The semantic segmentation method may be the same process as a method of the related art. SegNet, U-Net, and the like are known as neural networks capable of performing region division with a high level of accuracy.

These networks are called encoder-decoder types, and characteristics required for category classification are comprehensively unified while pooling is performed on the first half of the encoder side. Next, region division (category classification) is realized step by step from category determination in units of regions to category determination in units of pixels while upsampling is performed on the second half of the decoder side.

In the present embodiment, for these general neural networks, semantic segmentation is performed using a model machine-learned by a learning image data set associated with a category (e.g., person, vehicle, sign) determination for each pixel. FIG. 4C shows a semantic segmentation result for the image data. In the present embodiment, a target region (shown by the frame of a solid line) enlarged on the basis of IoU or the like is set from the detection region (shown by the frame of a broken line) in object detection, and semantic segmentation is performed on this target region. Therefore, region division can be performed on objects (e.g., person, vehicle, sign) and background portions with a high degree of accuracy.

Next, in S306, the region shift estimation unit 205 estimates an amount of region shift included in the detection region. In S303, a method of estimating an amount of region shift in a case where IoU=50% is assumed has been described. This is effective as a method of assuming an amount of region shift in a case where the detection accuracy of object detection is known in advance. However, actually, the detection accuracy of object detection varies depending on the imaging environment and the variety of target objects. Therefore, it may be desirable that the amount of region shift is estimated by feedback in real time from the category of an object actually detected and the imaging environment, and such a configuration is used in the present embodiment.

A method of estimating an amount of region shift for each category from a detection region based on object detection of the present embodiment and a result of semantic segmentation will be described with reference to FIG. 6.

Figure 6A:
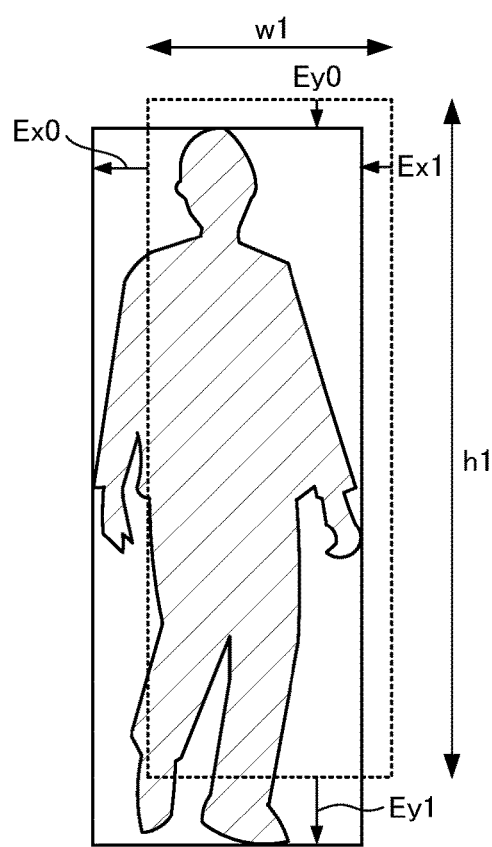
FIGS. 6A and 6B are diagrams illustrating region shift estimation in the first embodiment.
Figure 6B:
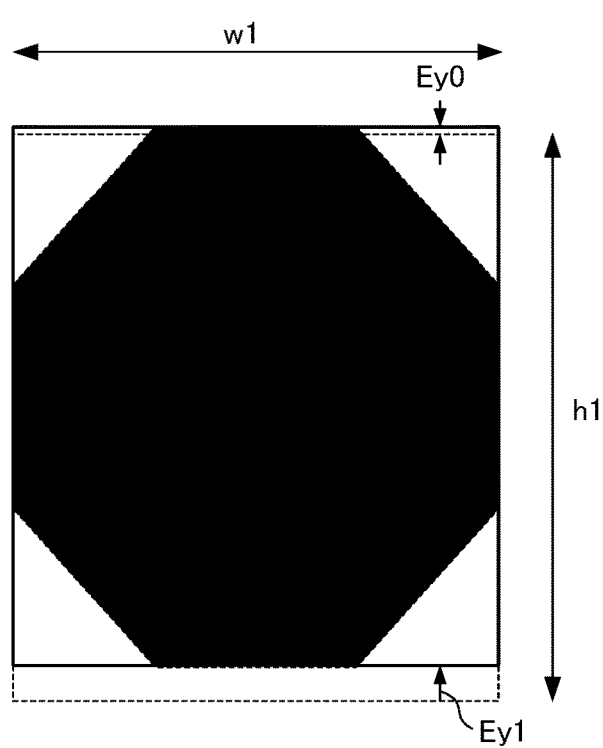

FIG. 6 is a diagram illustrating region shift estimation in the first embodiment; FIG. 6A shows an example of a person, and FIG. 6B shows an example of semantic segmentation of a road sign. In each case, the frame of the broken line shows a detection region based on object detection; the oblique portion of FIG. 6A is an example of a person, and the black portion of FIG. 6B is an example in which region division is performed on a road sign by semantic segmentation on the basis of a category.

First, a correct-answer region is estimated for an object on which region division is performed by semantic segmentation on the basis of a category. The correct-answer region is a rectangular region circumscribing the above object on which region division is performed. Specifically, it can be obtained by narrowing the rectangular region sufficiently extended in the vertical and horizontal directions from the object detection region on a region division map gradually in the reduction direction and stopping the reduction of a side that initially touches a category value (person, vehicle, sign) of a detection target on the upper, lower, right, and left sides. In this manner, the shift of the target region is estimated by calculating a difference between the position of the correct-answer region (shown by the frame of a solid line) of the object to which a category is assigned and the position of the object detection region.

A difference on the left side of the detection region is set to $Ex0$, a difference on the right side thereof is set to $Ex1$, a difference on the upper side thereof is set to $Ey0$, and a difference on the lower side thereof is set to $Ey1$. The amount of region shift is estimated by the ratio of the width or height of the detection region. Specifically, the amount of shift on the left side between the detection region and the correct-answer region is estimated to be $Ex0/w1$, the amount of shift on the right side is estimated to be $Ex1/w1$, the amount of shift on the upper side is estimated to be $Ey0/h1$, and the amount of shift on the lower side is estimated to be $Ey1/h1$. They are estimated by ratios with positive and negative, the positive ratio indicates a direction in which the detection region is enlarged, and the negative ratio indicates a direction in which the detection region is reduced.

The amount of region shift estimated here is fed back to the region setting unit 202, and is referenced as a ratio of increase and decrease in vertical and horizontal directions in a case where the detection region is corrected during region setting. Meanwhile, object detection and semantic segmentation output a result including fluctuation in accordance with the image data. Therefore, in the estimation of the amount of region shift, the amount of region shift can be estimated with a higher degree of accuracy by smoothing a plurality of amounts of region shift in each direction and calculating the amount of region shift. Therefore, such a configuration may be used.

Also, since the amount of region shift may increase suddenly, a margin may be provided in the direction of enlarging the detection region with respect to the estimated amount of region shift. Further, the tendency of the amount of region shift differs depending on a category to be detected. For example, since the detection region in which the category shown in FIG. 6A is a person, which has many variable factors, such as the body shape, clothes, and posture of a person, the amount of region shift tends to increase. On the other hand, since the size, color, and shape of the sign shown in FIG. 6B are determined to some extent by traffic standards and the like, the amount of shift in the detection region is relatively small.

Therefore, when the amount of region shift is estimated, the amount of region shift according to a category may be estimated, and the detection region may be corrected in the region setting unit 202 using the amount of region shift according to a category.

By the above processing, it is possible to realize high-accuracy region division in a state where a processing load is suppressed by performing semantic segmentation on a minimum necessary region with respect to an object detected with high robustness by object detection.

(Modification Example 1 of Image Processing Unit)

In the above, an example is shown in which a target region is set for each object detected by object detection and semantic segmentation is performed. In this modification example, one target region including a plurality of detected objects may be set for these objects, and semantic segmentation may be performed.

FIG. 4D is an example in which the corrected detection region is calculated for each individual object, a region 400 including a plurality of corrected detection regions is then set as the target region of semantic segmentation, and the semantic segmentation is performed. As the number of objects to be detected increases and the density increases, it can be considered that the regions overlap each other. In such as case, it may be possible to reduce the entire processing load by setting a comprehensive region, such as the region 400, as the target region and performing semantic segmentation.

(Modification Example 2 of Image Processing Unit)

In the above, as a machine learning model for semantic segmentation, an example of using a model learned so that a region can be divided on the basis of a category (e.g., person, vehicle, sign) has been described. On the other hand, an example of setting a target region for each object detected by object detection and performing semantic segmentation has been described. That is, for the target region in which semantic segmentation is performed, a category for which region division is attempted to be performed is known in advance. Therefore, the semantic segmentation method may be switched in accordance with the category.

In the case of, for example, a road sign, it may be possible to suppress a processing load by holding a standard sign image determined in advance by a standard as a template and performing region division through matching with this template. Also, regarding the region division of a vehicle, it is possible to improve the accuracy of region division by temporarily performing the estimation of the vehicle model or the like and performing semantic segmentation using information on this vehicle model as additional information.

It may be determined to perform semantic segmentation by switching between models that have been learned separately in accordance with a category in advance or different parameter sets that define learning content. This makes it possible to easily improve the learning efficiency of region division in individual categories or to add categories for region division later.

Second Embodiment

In a second embodiment of the present disclosure, object detection is performed on image data, and a category and a detection region thereof are specified. Further, an example of variably magnifying a region including a detected target object to a region size expected to have the highest division accuracy of semantic segmentation and processing the region will be described.

The configuration of an image processing device of the present embodiment may be the same configuration as that of the first embodiment shown in FIG. 1, and thus the description thereof will be omitted.

(Configuration of Image Processing Unit)

Figure 7:
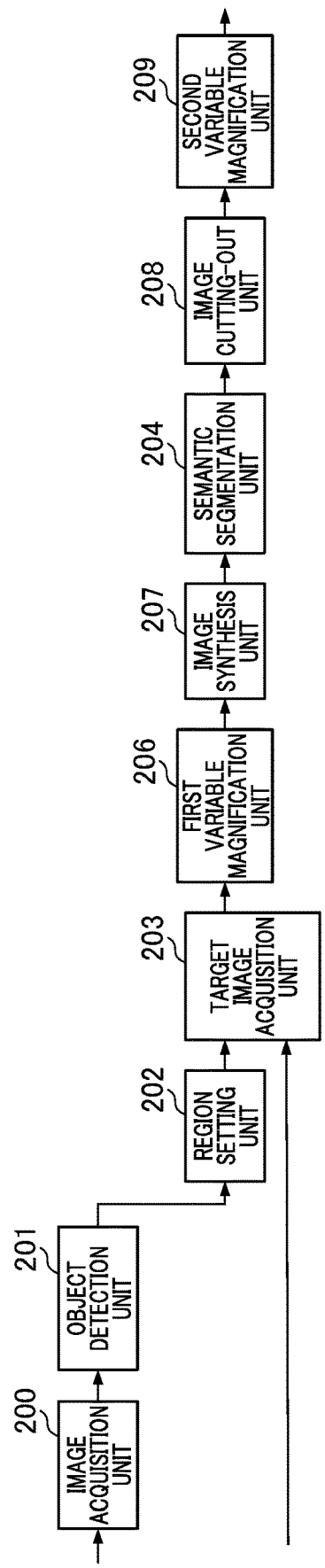
FIG. 7 is a block diagram illustrating a configuration example of an image processing unit in a second embodiment.

FIG. 7 is a block diagram illustrating a configuration example of an image processing unit in a second embodiment.

Figure 8:
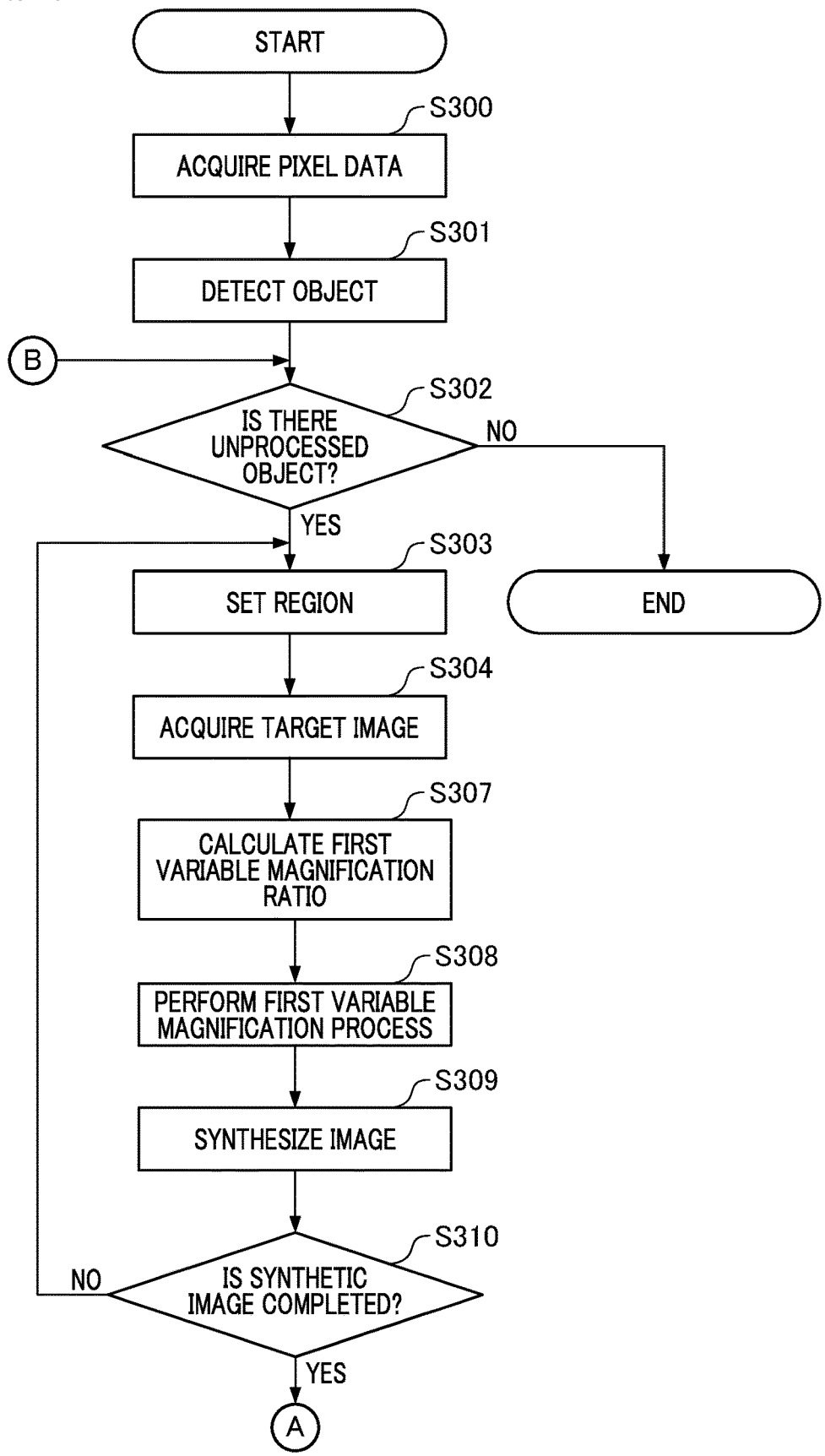
FIG. 8 is a flowchart illustrating an operation example of the image processing unit in the second embodiment.

Also, FIG. 8 is a flowchart illustrating an operation of the image processing unit 104 in the second embodiment. Meanwhile, the detailed description of the above-described components having the same names and the same reference numerals will be omitted, and the description thereof will be given only in a case where there is a difference.

The image processing unit 104 of the second embodiment includes the image acquisition unit 200, the object detection unit 201, the region setting unit 202, the target image acquisition unit 203, and the semantic segmentation unit 204. Further, the image processing unit includes a first variable magnification unit 206, an image synthesis unit 207, an image cutting-out unit 208, and a second variable magnification unit 209. Before the image data of the target region which is set by the region setting unit 202 is supplied to the semantic segmentation unit 204, the image data is variably magnified at a first variable magnification ratio by the first variable magnification unit 206.

Also, the image data of the target region variably magnified by the first variable magnification unit is synthesized with image data of another target region by the image synthesis unit 207 and then supplied to the semantic segmentation unit 204. Also, the image data after the category is assigned to the pixel belonging to the category by the semantic segmentation unit 204 is variably magnified at a second variable magnification ratio by the second variable magnification unit 209. Meanwhile, although not shown in FIG. 7, the region shift estimation unit 205 similar to that of the first embodiment may be provided behind the second variable magnification unit 209 or the like.

Also, in the second embodiment, each of the reference numerals 200 to 209 and the like is a functional block which is realized by a processor.

The first variable magnification unit 206 enlarges or reduces image data of the target region at a variable magnification ratio such that the size on the image of the detection target becomes a size suitable for semantic segmentation. The image synthesis unit 207 synthesizes image data of a plurality of target regions and generates image data for performing semantic segmentation.

The image cutting-out unit 208 cuts out the region of the target object from the region division map on which semantic segmentation is performed. That is, before the image data, for which the respective category has been assigned to the pixels belonging to each category, is supplied to the second variable magnification unit 209 by the semantic segmentation unit 204, the image data is cut out for each target region.

The second variable magnification unit 209 enlarges or reduces the region division map at a variable magnification ratio which is a reciprocal of the variable magnification ratio in the first variable magnification unit 206, and obtains a region division map having the same resolution as the target object in the input image data.

(Description of Operation of Image Processing Unit)

Figure 9:
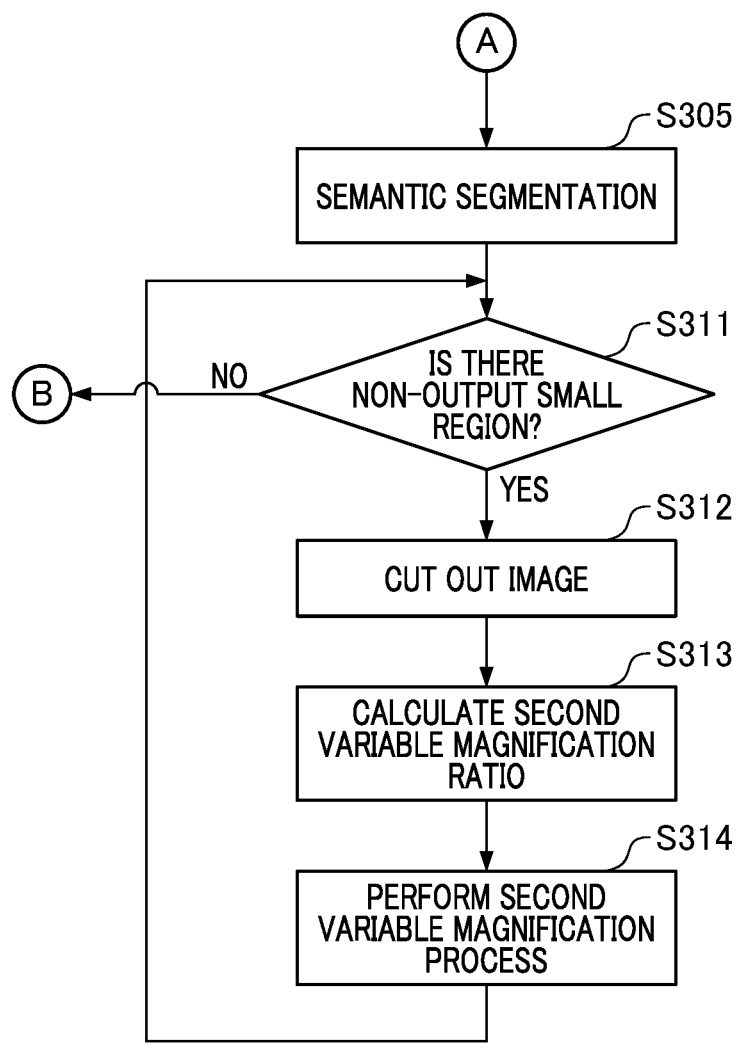
FIG. 9 is a flowchart illustrating an operation example subsequent to FIG. 8.

FIG. 8 is a flowchart illustrating an operation example of the image processing unit in the second embodiment, and FIG. 9 is a flowchart illustrating an operation example subsequent to FIG. 8. By the processor in the image processing unit 104 executing a computer program, the function of each block shown in FIG. 7 is realized, and the process of each operation in FIGS. 8 and 9 is performed. Meanwhile, the detailed description of operations having the same names and the same reference numerals stated above will be omitted, and the description thereof will be added in a case where there is a difference.

If the process is started, in S300 and S301, object detection is performed on the image data, and information on the category of the object and the detection region are obtained. Also, if there is an unprocessed object in S302, the detection region of each object is adaptively corrected using the same method as in the first embodiment in S303, the target region corresponding to the corrected detection region is set, and the image data of the target region is obtained in S304. If there is no unprocessed object in S302, the process ends.

In S307, the variable magnification ratio of the image data of the target region is determined so as to have an image size suitable for the semantic segmentation unit in the subsequent operation. In a neural network structure using machine learning, in order to enhance the robustness of the size of a detected object in the image, pooling layers are provided in multiple stages, and features are extracted at each resolution.

Thereby, if the outline of the object is clear, object detection and region division that do not depend on the size on the image are possible. However, as the number of stages of a hidden layer increases, the amount of calculation for inference and the amount of memory that holds parameter sets increase sharply, and thus the number of stages of the hidden layer is required to be appropriately set in accordance with the fluctuation amount of the size of a corresponding detected object.

Figure 10:
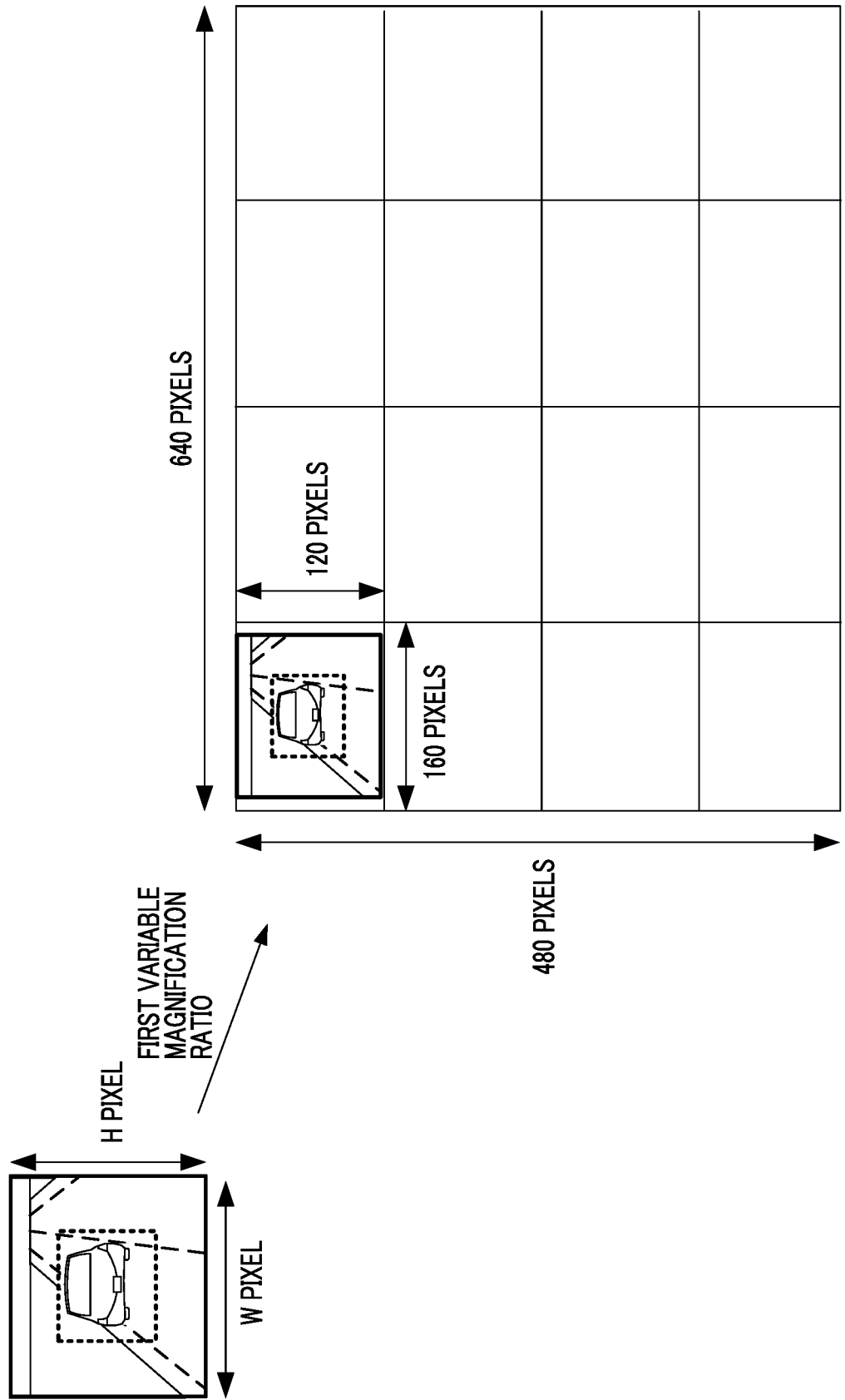
FIG. 10 is a diagram illustrating a method of determining a variable magnification ratio in the second embodiment.

FIG. 10 is a diagram illustrating a method of determining a variable magnification ratio in the second embodiment.

In the second embodiment, a VGA image (640 pixels wide and 480 pixels high) is assumed as the size of an input image for semantic segmentation, and the optimum object size for performing region division is approximately 100 pixels×approximately 100 pixels as a guide. In this manner, by determining the optimum object size for semantic segmentation to a certain size, it is possible to omit the hidden layer of the network configuration and to reduce a processing load.

Also, as a standard capable of reducing the hidden layer, if N and M are positive integers, it is preferable to variably magnify the object size so that it falls within the range of N pixels×M pixels to N/2 pixels×M/2 pixels. This is because the pooling process often halves the amount of data in the vertical and horizontal directions, and effective features are switched according to the number of times of pooling with respect to fluctuation in the object size. Also, even in the case of a model in which the optimum object size for performing region division is unclear, the optimum object size can be determined in advance by actually processing the object image of which the size has been changed and confirming the accuracy of division.

Considering a guide of this optimum object size and the detection region in object detection including the amount of fluctuation, the VGA image is divided into small regions each having a size of 160 pixels wide and 120 pixels high obtained by dividing the image into 16 parts vertically and horizontally. The variable magnification ratio is set so that the detection region including the object (region enlarged in consideration of the amount of fluctuation) enters this small region. In a case where the width of the detected object is W pixels and the height thereof is H pixels, the first variable magnification ratio can be determined without changing the aspect ratio of the object by selecting a variable magnification ratio for which variable magnification to a size (width, height) that can be stored in a small region is possible among variable magnification results obtained by (W/160) times and (H/120) times.

In S308, the first variable magnification unit 206 performs a first variable magnification process using the above first variable magnification ratio (first variable magnification step). As a method of the variable magnification process, a known method may be used. Meanwhile, in the cases of reduction and enlargement depending on the variable magnification ratio, the method of the variable magnification process may be changed. In the region division based on semantic segmentation, the clearness of the shape of the object greatly influences the accuracy of region division, but in the case of reduction, the shape of original image data is not likely to deteriorate, and thus a low-order interpolation method (e.g., bi-linear interpolation) may be used. On the other hand, since the shape has a tendency to deteriorate in the case of enlargement, it is possible to balance the amount of calculation and the accuracy of region division using a high-order interpolation method (such as bi-cubic interpolation or Lanczos interpolation).

In S309, the image synthesis unit 207 generates synthesized image data for input to the semantic segmentation unit 204 (image synthesis step). In the present embodiment, as shown in FIG. 9, image data is generated by sequentially synthesizing a region including an object of which the size has been adjusted by different variable magnification ratios in each of small regions obtained by dividing the VGA image into 16 parts.

Meanwhile, if the number of object detections is less than 16, semantic segmentation may be performed in a state where there is a small blank region. In the image cutting-out unit 208 in the subsequent stage, the small blank region is not cut out, and thus even if there is a small blank region, it is not influenced. Meanwhile, one reason for performing synthesis in S309 is to improve processing efficiency in the semantic segmentation unit 204.

In S310, whether the synthetic image is completed is determined and branching is performed. If the synthetic image is not completed, the process returns to S303, and the processing region for the next object is synthesized. Also, if the synthetic image is completed, the process proceeds to S305 of FIG. 9, and a region division map of the synthetic image is obtained by performing semantic segmentation on the synthetic image.

In S311, in the region division map of the synthetic image, whether there is a non-output small region is determined and branching is performed. If there is a non-output small region, the process proceeds to S312, and if all the small regions have been output, the process proceeds to S302.

In S312, the image cutting-out unit 208 cuts out a region division map for one object from the region division map of the synthetic image. In the present embodiment, since the synthetic image is constituted by 16 divided small regions, the small regions are sequentially cut out.

In S313, a second variable magnification ratio is calculated. The second variable magnification ratio is a variable magnification ratio for returning a small region of the synthetic image to the original resolution. Therefore, it is calculated by calculating the reciprocal of the first variable magnification ratio.

In S314, the second variable magnification unit 209 performs the second variable magnification process on the basis of the second variable magnification ratio (second variable magnification step). The second variable magnification process is performed on the region division map. Unlike ordinary image data, the region division map is stored by a value indicating a category being added to the pixel value. Meanwhile, it may not be preferable that a value different from the category value is output using the interpolation process. Therefore, in the present embodiment, as the second variable magnification process, an interpolation method, such as nearest neighbor interpolation, is used in which only the category value appears in a map after interpolation.

The above process enables efficient and high-accuracy region division while reducing the processing load of semantic segmentation. Meanwhile, the synthetic image shown in the present embodiment is for improving processing efficiency, and the effect of the present embodiment can be obtained using at least the first variable magnification process suitable for region division and the second variable magnification process for returning to an input resolution.

Third Embodiment

In a third embodiment, a synthetic image is generated by disposing the image data of the target region at either a predetermined image position determined in advance according to the category detected by object detection or a predetermined position shared by a plurality of categories. Semantic segmentation is then performed on the synthetic image.

The configuration of an image processing device to which the third embodiment is applied may be the same configuration as that of the first embodiment and the second embodiment, and the description thereof will be omitted. Also, the configuration of the image processing unit 104 can be realized by the configuration of the second embodiment, and thus the description thereof will be omitted.

In the present embodiment, the learning efficiency of semantic segmentation is enhanced by the operations of the image synthesis unit 207 and the image cutting-out unit 208 shown in FIG. 7.

Figure 11:
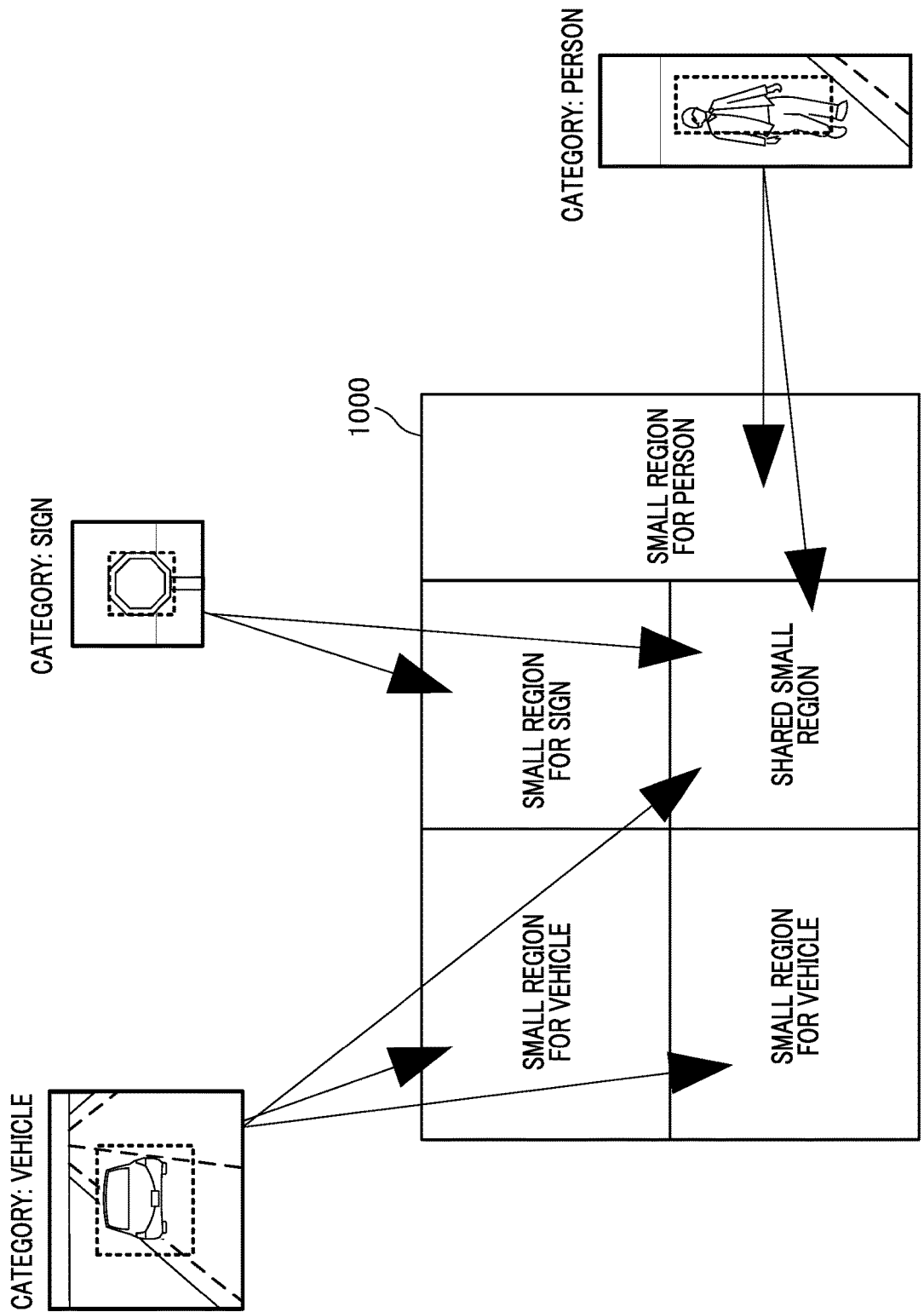
FIG. 11 is a diagram illustrating an image synthesis method in a third embodiment.

FIG. 11 is a diagram illustrating an image synthesis method in the third embodiment, and shows a synthetic image 1000 which is synthesized by the image synthesis unit 207. The synthetic image 1000 is divided into a small region of which the position is fixed in advance in accordance with the categories and a small region common to the categories.

Also, arrows indicate at which image position the enlarged target region is disposed and synthesized in accordance with the category in consideration of a shift from a region having a possibility of a correct-answer region actually being present on the basis of the category of the object and the detection region detected by object detection.

By limiting the region of the image in which the object is present in advance in accordance with the category of the object, it is possible to omit learning of comprehensive features in a model when semantic segmentation is realized. Particularly, a high learning efficiency effect can be obtained in a network configuration having a hidden layer that influences most of the image, which is called a bottleneck layer.

At the time of model learning, it is generally not known at which position on the image the object appears, and thus it is necessary to assume various patterns and perform learning in the combination of the category of the object and its position where the object appears. However, by combining object detection as in third embodiment, it is possible to fix the category of the object and its position where the object appears, and to improve the learning efficiency by limiting a learning pattern. In addition, since a boundary between small regions is always present, the range of necessary features is limited to between the small regions, and thus learning of the bottleneck layer can be omitted.

Figure 12:
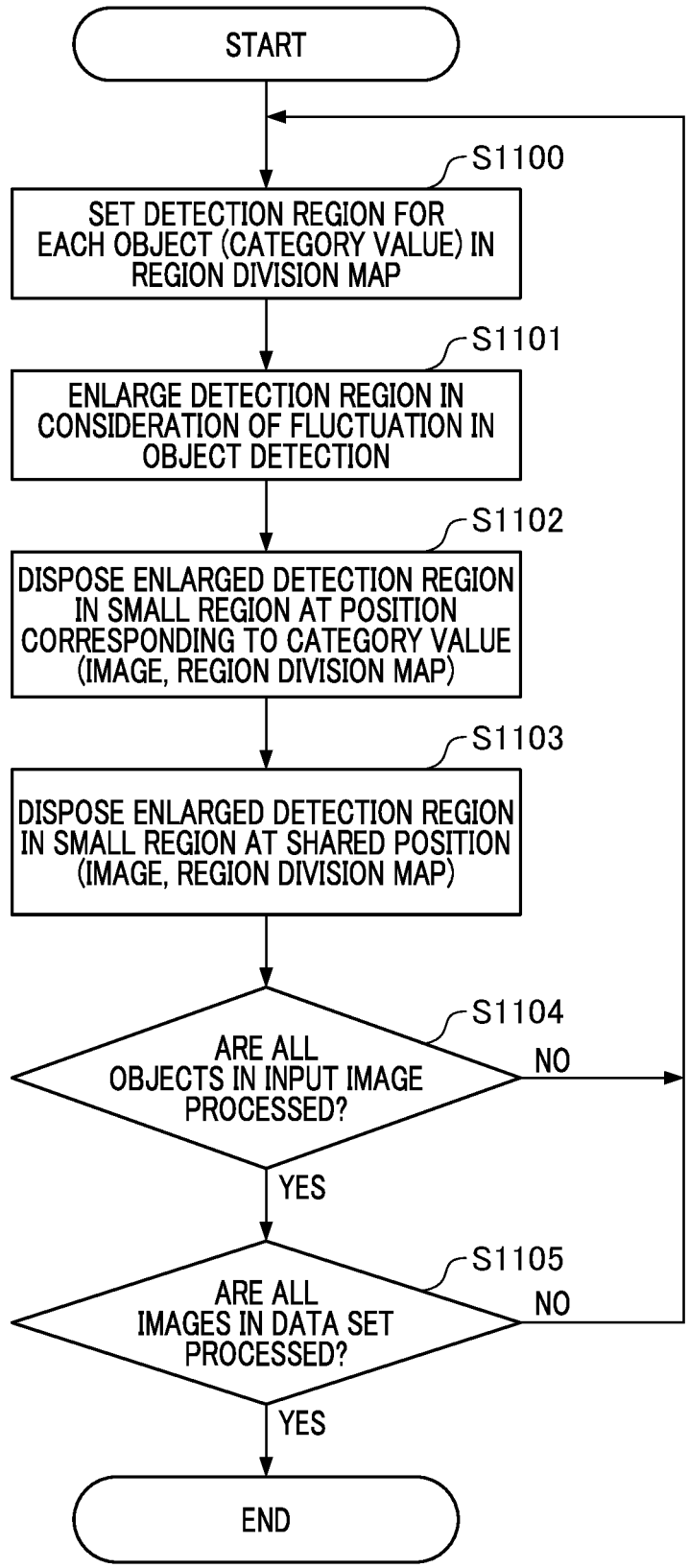
FIG. 12 is a flowchart illustrating a method of creating a learning image used for model learning in the third embodiment.

FIG. 12 is a flowchart illustrating a method of creating a learning image used for model learning in the third embodiment, and corresponds to the synthesis process of S309 in FIG. 8. By the processor in the image processing unit 104 executing a computer program, the function of each block shown in FIG. 7 is realized, and the process of each operation in FIG. 12 is performed.

A method of creating a learning image in the present embodiment is premised on preparing (setting) a general data set (a set of an input image and a region division map divided for each category of the object present in the input image) in advance.

Therefore, in S1100, a detection region for each object (category value) in the image is set in the region division map. The detection region sets a rectangular region circumscribing the object. In the region division map, since the same objects are connected to each other by the same category value, it is possible to perform setting automatically to some extent by gradually narrowing the rectangular region in the vertical and horizontal directions of the object and fixing a side in contact with the category value.

In S1101, the detection region is enlarged with respect to the detection region in S1100 in consideration of fluctuation in object detection. For a method of enlarging a detection region, enlargement using the method described in the first embodiment is possible.

In S1102, the detection region enlarged in S1101 is disposed with respect to the small region at the position corresponding to the category value. In this case, the enlarged detection region is disposed after variable magnification is performed according to the size of the small region. In S1102, both the image data serving as input data during learning and the region division map associated with the image data are generated.

In S1103, the detection region enlarged in S1101 is disposed with respect to the small region at the shared position. In this case, the variable magnification process is performed according to the size of the small region at the shared position, but if it is different from the size of the small region for each category in S1102, variable magnification is performed with a different variable magnification ratio. Also in S1103, both the image data serving as input data during learning and the region division map associated with the image data are generated, but may be generated in the form of overwriting the data generated in S1102.

In S1104, all the objects in the input image of the data set are processed or branched.

In S1105, all the images in the data set are processed or branched.

By the above process, the input image data during learning in the present embodiment and the region division map which is a correct answer can be obtained. These data sets can be used to efficiently learn a model of semantic segmentation.

Also, by determining a small region use category in advance as in the third embodiment, if there is a bias in the appearance of the object, for example, if there are a large number of objects in the vehicle category, or the like, the execution efficiency of semantic segmentation may decrease. On the other hand, in the present embodiment, by setting a shared small region, it is possible to prevent the execution efficiency from decreasing depending on the frequency of appearance of the object. Meanwhile, setting a shared small region has a trade-off relationship with learning efficiency.

Also, the synthetic image can be generated more efficiently by disposing the image data of the detection region in a region of a predetermined aspect ratio in accordance with the small region use category to generate the synthetic image. For example, by setting a small region close to a square in the case of the vehicle category and setting a vertically long small region in the case of the person category, it is possible to spread the small region efficiently and to improve the execution efficiency of semantic segmentation.

As described above, by synthesizing image data of which the placement position is determined in advance in accordance with the category of the object and performing semantic segmentation on the synthesized image data, it is possible to efficiently realize high-robustness and high-accuracy region division.

Also, if an imaging device having an image processing device or an image processing device in the embodiments is mounted in a moving device, such as an automobile, it has, for example, the following configuration. That is, the semantic segmentation unit 204 provides a control unit that controls a warning relating to an obstacle or movement operations, such as the direction or speed, of the moving device on the basis of the image data after the category is assigned to a pixel belonging to the category.

In the image processing device of the present embodiments, a result of high-robustness and high-accuracy region division can be obtained while suppressing a processing load, and thus it is possible to recognize, for example, a distant front vehicle, an obstacle, or the like more quickly and to obtain an excellent effect such as being able to quickly avoid an accident.

While the present disclosure has described exemplary embodiments, it is to be understood that some embodiments are not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiments described above may be supplied to the image processing apparatus through a network or various storage media. Then, a computer (or a CPU, an MPU, or the like) of the image processing apparatus may be configured to read and execute the program. In such a case, the program and the storage medium storing the program configure the present disclosure.

This application claims priority to Japanese Patent Application No. 2021-056596, which was filed on Mar. 30, 2021 and which is hereby incorporated by reference herein in its entirety.

What is claimed is:

1. An image processing device comprising at least one processor configured to function as:
an object detection unit configured to detect an object from image data by using neural networks;
a region setting unit configured to set a target region in which a category is assigned to pixels in accordance with a detection result of the object detection unit; and
a category assignment unit configured to assign the category to the pixels belonging to the category of the target region which is set by the region setting unit by using a semantic segmentation,
wherein the region setting unit is configured to set the target region in which the category is assigned to pixels in accordance with the detection result of the object detection unit based on an overlap rate between a detection region and a correct-answer region.

2. The image processing device according to claim 1, wherein the region setting unit sets the target region by enlarging a detection region in which the object detection unit detects the object.

3. The image processing device according to claim 2, wherein the region setting unit sets the target region by correcting the detection region in accordance with the category.

4. The image processing device according to claim 2, wherein the region setting unit corrects each of a plurality of the detection regions detected by the object detection unit and sets a region including the plurality of corrected detection regions as the target region.

5. The image processing device according to claim 1, wherein the at least one processor is further configured to function as a region shift estimation unit configured to estimate a shift of the target region on the basis of a position of the object to which the category is assigned by the category assignment unit.

6. The image processing device according to claim 5, wherein the region setting unit sets the target region by referencing the region shift estimated by the region shift estimation unit.

7. The image processing device according to claim 6, wherein the region shift estimation unit estimates the region shift by comparing the position of the object to which the category is assigned by the category assignment unit with a position of a detection region in which the object detection unit detects the object.

8. The image processing device according to claim 5, wherein the region shift estimation unit estimates an amount of region shift in accordance with the category.

9. The image processing device according to claim 1, wherein the category assignment unit assigns the category using different parameter sets in accordance with the category of the object detected by the object detection unit.

10. An image processing device comprising at least one processor configured to function as:
an object detection unit configured to detect an object from image data by using neural networks and output a category of the object and a predetermined detection region in which the object is detected;
a category assignment unit configured to assign the category to pixels belonging to the category in the image data of the detection region by using a semantic segmentation; and
a first variable magnification unit configured to variably magnify the image data of the detection region at a first variable magnification ratio before the image data is supplied to the category assignment unit,
wherein the category assignment unit is configured to set the detection result based on an overlap rate between the detection region and a correct-answer region.

11. The image processing device according to claim 10, further comprising a second variable magnification unit configured to variably magnify the image data after the category is assigned to the pixels belonging to the category by the category assignment unit at a second variable magnification ratio.

12. The image processing device according to claim 11, wherein the second variable magnification ratio is a reciprocal of the first variable magnification ratio.

13. The image processing device according to claim 11, wherein the at least one processor is further configured to function as a cutting-out unit configured to cut out the image data for each target region after the category is assigned to the pixels belonging to the category by the category assignment unit, before the image data is supplied to the second variable magnification unit.

14. The image processing device according to claim 10, wherein the at least one processor or further configured to function as an image synthesis unit configured to synthesize the image data of the detection region variably magnified by the first variable magnification unit with image data of another detection region and then supply the synthesized image data to the category assignment unit.

15. The image processing device according to claim 14, wherein the image synthesis unit generates a synthetic image by disposing the image data of the detection region at either a predetermined position according to the category or a predetermined position shared by a plurality of the categories.

16. The image processing device according to claim 14, wherein the image synthesis unit generates a synthetic image by disposing the image data of the detection region at a predetermined position according to the category.

17. The image processing device according to claim 14, wherein the image synthesis unit generates a synthetic image by disposing the image data of the detection region in a region having a predetermined aspect ratio according to the category.

18. The image processing device according to claim 10, wherein the category assignment unit includes a machine learning model configured to assign the category to the pixels belonging to the category within the image data of the detection region.

19. The image processing device according to claim 18, wherein the category assignment unit performs semantic segmentation on the detection region.

20. An image processing method comprising:
   detecting an object from image data by using neural networks;
   setting a target region in which a category is assigned to pixels in accordance with a detection result in the object detecting; and
   assigning the category to the pixels belonging to the category of the target region which is set in the region setting by using a semantic segmentation,
   wherein the setting sets the target region in which the category is assigned to pixels in accordance with the detection result of the object detecting based on an overlap rate between a detection region and a correct-answer region.

21. The image processing method according to claim 20, further comprising:
   performing first variable magnifying of the image data of the target region which is set in the region setting at a first variable magnification ratio before the image data is supplied in the category assigning; and
   performing second variable magnifying of the image data after the category is assigned to the pixels belonging to the category in the category assigning at a second variable magnification ratio.

22. The image processing method according to claim 21, wherein the second variable magnification ratio is a reciprocal of the first variable magnification ratio.

23. The image processing method according to claim 21, further comprising synthesizing the image data of the target region variably magnified in the first variable magnifying with image data of another target region and then supplying the synthesized image data for the category assigning.

24. A moving device having an image processing device mounted therein, the image processing device including:
   an object detection unit configured to detect an object from image data by using neural networks;
   a region setting unit configured to set a target region in which a category is assigned to pixels in accordance with a detection result of the object detection unit; and
   a category assignment unit configured to assign the category to the pixels belonging to the category of the target region which is set by the region setting unit by using a semantic segmentation,
   wherein the moving device comprises a control unit configured to control a warning or a movement operation of the moving device based on the image data after the category is assigned to the pixels belonging to the category by the category assignment unit,
   wherein the region setting unit is configured to set the target region in which the category is assigned to pixels in accordance with the detection result of the object detection unit based on an overlap rate between a detection region and a correct-answer region.

25. A non-transitory computer-readable storage medium storing a computer program for an image processing device to execute operations comprising:
   detecting an object from image data by using neural networks;
   setting a target region in which a category is assigned to pixels in accordance with a detection result in the object detecting; and
   assigning the category to the pixels belonging to the category of the target region which is set in the region setting by using a semantic segmentation,
   wherein the setting sets the target region in which the category is assigned to pixels in accordance with the detection result of the object detecting based on an overlap rate between a detection region and a correct-answer region.

26. A non-transitory computer-readable storage medium storing a computer program for a moving device to execute operations comprising:
   detecting an object from image data by using neural networks;
   setting a target region in which a category is assigned to pixels in accordance with a detection result in the object detecting;
   assigning the category to the pixels belonging to the category of the target region which is set in the region setting by using a semantic segmentation; and
   controlling a warning or a movement operation of the moving device based on the image data after the category is assigned to the pixels belonging to the category in the category assigning,
   wherein the setting sets the target region in which the category is assigned to pixels in accordance with the detection result of the object detecting based on an overlap rate between a detection region and a correct-answer region.

* * * * *